US008990322B2

(12) United States Patent
Cai et al.

(10) Patent No.: US 8,990,322 B2
(45) Date of Patent: Mar. 24, 2015

(54) ARCHIVE CONTROL FOR TEXT MESSAGES

(75) Inventors: Yigang Cai, Naperville, IL (US); Shaumir Shah, Aurora, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 458 days.

(21) Appl. No.: 13/240,783

(22) Filed: Sep. 22, 2011

(65) Prior Publication Data

US 2013/0080540 A1 Mar. 28, 2013

(51) Int. Cl.

| G06F 15/16 | (2006.01) |
|---|---|
| H04W 4/14 | (2009.01) |
| G06Q 10/10 | (2012.01) |
| H04W 12/08 | (2009.01) |
| H04L 12/58 | (2006.01) |
| H04W 4/18 | (2009.01) |

(52) U.S. Cl.
CPC ............ *H04W 4/14* (2013.01); *G06Q 10/107* (2013.01); *H04W 12/08* (2013.01); *H04L 51/22* (2013.01); *H04W 4/185* (2013.01); *H04L 51/38* (2013.01)
USPC ........................................................ 709/206

(58) Field of Classification Search
USPC ........................................................ 709/206
See application file for complete search history.

(56) References Cited

U.S. PATENT DOCUMENTS

| 6,035,327 | A | * | 3/2000 | Buckley et al. ............... 709/206 |
|---|---|---|---|---|
| 6,055,302 | A | * | 4/2000 | Schmersel et al. ....... 379/201.01 |
| 7,228,334 | B1 | * | 6/2007 | Jordan, Jr. .................... 709/206 |
| 7,299,061 | B2 | * | 11/2007 | Kramarz-Von Kohout .. 455/466 |
| 7,849,213 | B1 | * | 12/2010 | Borghetti ...................... 709/238 |
| 7,912,908 | B2 | * | 3/2011 | Cai et al. ....................... 709/206 |
| 7,970,743 | B1 | | 6/2011 | Kilday |
| 8,073,122 | B2 | * | 12/2011 | Kay et al. ................ 379/201.01 |
| 8,171,087 | B2 | * | 5/2012 | Carrer et al. .................. 709/206 |
| 8,176,064 | B2 | * | 5/2012 | Huomo et al. ................ 707/758 |
| 8,832,802 | B2 | * | 9/2014 | Orbach et al. .................... 726/4 |
| 2004/0177042 | A1 | * | 9/2004 | Fostick ........................... 705/51 |
| 2005/0064881 | A1 | * | 3/2005 | Kramarz-Von Kohout .. 455/466 |
| 2005/0091318 | A1 | * | 4/2005 | Keohane et al. .............. 709/206 |

(Continued)

OTHER PUBLICATIONS

"3rd Generation Partnership Project;Technical Specification Group Core Network and Terminals;Technical realization of the Short Message Service (SMS) (Release 9)" 3GPP TS 23.040 V9.2.0 (Mar. 2010), Valbonne—France, © 2010, 3GPP Organizational Partners (ARIB, ATIS, CCSA, ETSI, TTA, TTC). All rights reserved.

(Continued)

*Primary Examiner* — Douglas Blair
(74) *Attorney, Agent, or Firm* — Duft Bornsen & Fettig, LLP

(57) ABSTRACT

Systems and methods for controlling how text messages are archived. A system identifies a text message for delivery over a mobile network, and identifies protection information for controlling archiving of the text message. The system inserts the protection information in the text message, and transmits the text message with the protection information towards a destination. The same or another system, such as a message center, receives the text message, and identifies the protection information inserted in the text message. The receiving system further identifies an end user associated with the text message, and identifies privacy policies provisioned for the end user. The receiving system then processes the privacy policies and the protection information to determine if the text message is authorized to be archived, such as in an archive server.

10 Claims, 5 Drawing Sheets

(56) References Cited

U.S. PATENT DOCUMENTS

| | | | |
|---|---|---|---|
| 2006/0053200 A1 | 3/2006 | McCown | |
| 2006/0075032 A1 | 4/2006 | Jain | |
| 2007/0117542 A1* | 5/2007 | Kramarz-Von Kohout | 455/412.1 |
| 2007/0124789 A1* | 5/2007 | Sachson et al. | 725/117 |
| 2007/0226367 A1* | 9/2007 | Cai et al. | 709/238 |
| 2008/0046352 A1* | 2/2008 | Jung et al. | 705/37 |
| 2008/0172462 A1* | 7/2008 | Carrer et al. | 709/204 |
| 2010/0223097 A1* | 9/2010 | Kramer et al. | 705/10 |
| 2010/0250686 A1* | 9/2010 | O'Sullivan et al. | 709/206 |
| 2010/0304766 A1* | 12/2010 | Goyal | 455/466 |
| 2011/0202756 A1* | 8/2011 | West | 713/152 |
| 2012/0100830 A1* | 4/2012 | Barber et al. | 455/410 |
| 2012/0297463 A1* | 11/2012 | Orbach et al. | 726/4 |

OTHER PUBLICATIONS

"Short Message Service (SMS) for Wideband Spread Spectrum Systems, Release A" (C) 3GPP2 and its Organizational Partners, Jan. 11, 2002, 3GPP2 C.S0015-A, Version 1.0.

* cited by examiner

ARCHIVE CONTROL FOR TEXT MESSAGES

FIELD OF THE INVENTION

The invention is related to the field of communications and, in particular, to text messaging, such as Short Message Service (SMS).

BACKGROUND

Text messaging has become a popular mode of communication in many mobile (or wireless) networks. One example of text messaging is Short Message Service (SMS), which is a set of communication protocols allowing the exchange of short text messages (i.e., 160 characters or less) between devices. While the term "text message" traditionally referred to text-only messages sent using SMS, it has been extended to include multimedia messages, such as images, video, sound content, etc. The multimedia messages may be sent using Multimedia Message Service (MMS) protocol. Many mobile users more frequently use text messaging for communication than voice calls.

One service offered for SMS messaging is an archive service or backup service. An archive service allows end users to store a record of SMS messages that are sent or received through a particular mobile device. For example, an application may be loaded onto a mobile device that is programmed to send a copy of SMS messages that are sent or received to a secure online server for long-term storage. The end user may then access the SMS record at a later time. In another example, service providers may implement an archive server that stores text messages for end users that subscribe to an archive service.

SUMMARY

Embodiments described herein provide control over archiving of text messages. Present archive/backup services store all text messages associated with an end user or a mobile device. The present archive/backup services do not provide protection on how or which text messages are stored. Some of the text messages may be private in nature, such as messages that include financial or medical content. Thus, it is desirable to implement controls on how/which text messages are archived. In the embodiments described herein, protection information is inserted in a text message to indicate whether the text message is authorized to be archived. The devices and systems that handle the text message may then process the protection information before archiving the text message. Thus, there is a determination made on a message-by-message basis as to whether a text message is archived.

One embodiment comprises a system that inserts protection information in a text message. Some examples of a system in this embodiment are end user devices (e.g., a mobile phone) and automated message centers (e.g., ESME). The system includes a controller operable to identify a text message for delivery over a mobile network, and to identify protection information for controlling archiving of the text message. The controller is further operable to insert the protection information in the text message, such as in user data (i.e., payload) of the text message. The system further includes a network interface operable to transmit the text message with the protection information towards a destination over the mobile network.

Another embodiment comprises a method of inserting protection information in a text message. The method includes identifying a text message for delivery over a mobile network, and identifying protection information for controlling archiving of the text message. The method further includes inserting the protection information in the text message, and transmitting the text message with the protection information towards a destination over the mobile network.

Another embodiment comprises a system that controls archiving of text messages. Some examples of a system in this embodiment are message centers (e.g., an SMSC) and archive servers. The system includes a network interface operable to receive a text message. The system further includes a controller operable to identify protection information inserted in the text message, such as in the user data. The controller is further operable to identify an end user associated with the text message (e.g., sender or recipient), and to identify privacy policies provisioned for the end user. The controller is further operable to process the privacy policies and the protection information to determine if the text message is authorized to be archived. If authorized, then the controller is further operable to initiate archiving of the text message. If not, then the controller is further operable to block the text message from being archived.

Another embodiment is a method of controlling how text messages are archived. The method includes receiving a text message, and identifying protection information inserted in the text message. The method further includes identifying an end user associated with the text message, and identifying privacy policies provisioned for the end user. The method further includes processing the privacy policies and the protection information to determine if the text message is authorized to be archived. If authorized, then the method includes initiating archiving of the text message. If not, then the method includes blocking the text message from being archived.

Other embodiments include control for forwarding or copying text messages.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
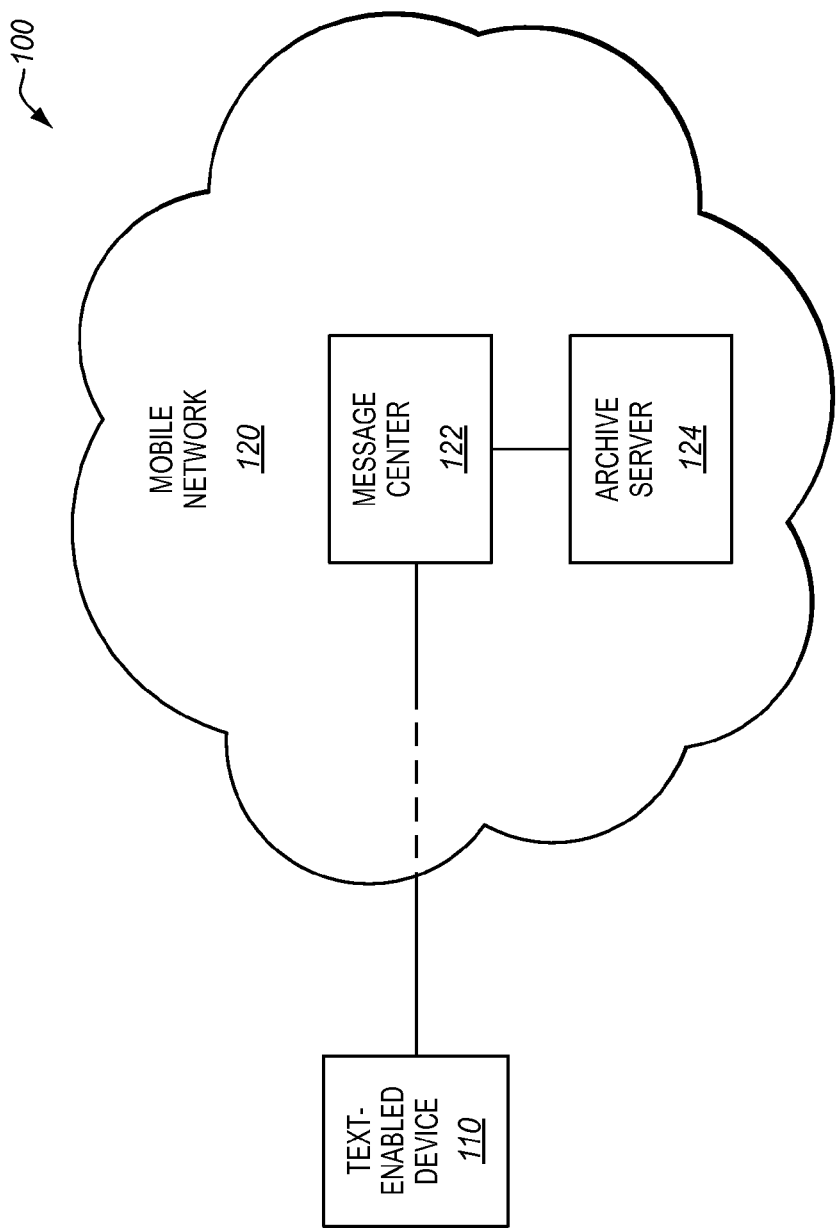
FIG. 1 illustrates a communication system in an exemplary embodiment.

FIG. 1 illustrates a communication system 100 in an exemplary embodiment. Communication system 100 includes a text-enabled device 110 connected to a mobile network 120. Device 110 comprises any system, server, or end user device operable to send or receive text messages, such as SMS or MMS messages. Device 110 may comprise an end user device (or User Equipment (UE)), such as a mobile phone. Device 110 may alternatively comprise an automated message center that generates text messages, such as an External Short Messaging Entity (ESME). Typical examples of ESMEs are systems that send automated marketing messages to mobile users, voting systems that process text message votes, etc.

Mobile network 120 provides services to device 110 and other devices not shown. The services offered and provided by mobile network 120 may vary, but at a minimum, device 110 has subscriptions for text messaging with mobile network 120. Mobile network 120 may comprise a circuit-switched mobile network, such as a cdma2000 network, a GSM network, etc. Mobile network 120 may also comprise a packet-switched network, such as an IP Multimedia Subsystem (IMS) network or a Long Term Evolution (LTE) network. Because mobile network 120 may represent different types of networks, device 110 may likewise represent different types of devices, such as mobile or cellular devices, wireline devices, SIP phones, dual mode devices, etc.

In this embodiment, mobile network 120 includes a message center 122. Message center 122 comprises any system, server, or device that facilitates delivery of text messages. For example, message center 122 may comprise a Short Message Service Center (SMSC), a Multimedia Message Service Center (MMSC), an IP Short Message Gateway (IP-SM-GW), etc. Because message center 122 may be implemented in multiple locations within network 120, it is merely shown as being included within network 120 and not tied to any specific network node. Although not shown in FIG. 1, those skilled in the art understand that other servers or nodes are connected between device 110 and message center 122, such as base stations, wireless access points, switching systems (e.g., MSC or S-CSCF), gateways, etc.

Mobile network 120 further includes an archive server 124. Archive server 124 comprises any system, server, or device that archives or otherwise saves text messages for long-term storage. Mobile network 120 may offer a service that allows end users to backup their text messages to a server instead of having to save the text messages on their phones. An archive service such as this may be provided by archive server 124 so that text messages sent or received by end users will be backed-up to server 124. Archive server 124 may be provided by a third party that is not affiliated with the service provider of mobile network 120.

Figure 2:
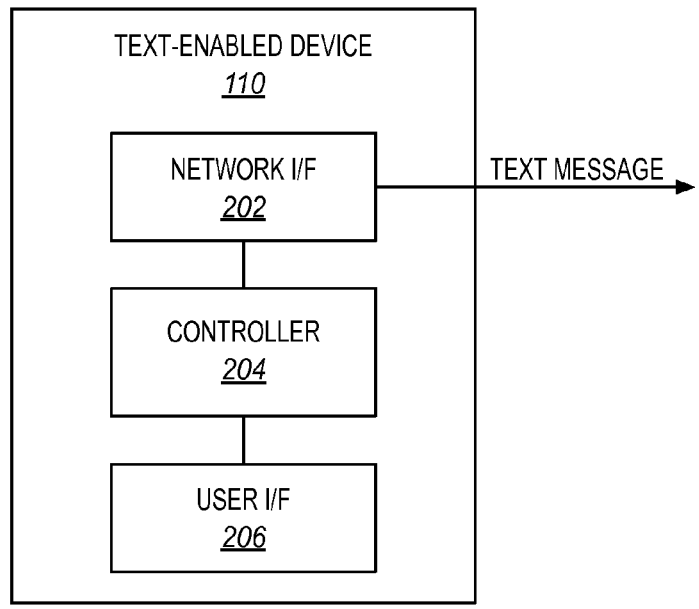
FIG. 2 illustrates a text-enabled device in an exemplary embodiment.

FIG. 2 illustrates text-enabled device 110 in an exemplary embodiment. Device 110 includes a network interface 202, a controller 204, and a user interface 206. Network interface 202 comprises any components, devices, or functions operable to exchange communications with other elements (e.g., message center 122) over network 120. Controller 204 comprises any components or devices operable to control the operations of device 110. User interface 206 comprises any components, devices, or functions operable to receive input from an end user, such as a keypad, a pointing device, etc, and/or convey content to the end user, such as a display, a speaker, etc.

In the embodiment described below, when device 110 sends a text message, protection information is inserted in the text message to control whether or not the text message is allowed to be archived. The protection information advantageously provides a layer of privacy for end users so that selected text messages are archived and selected text messages are blocked from being archived; especially the text messages that contain sensitive content, such as financial or medical content.

Figure 3:
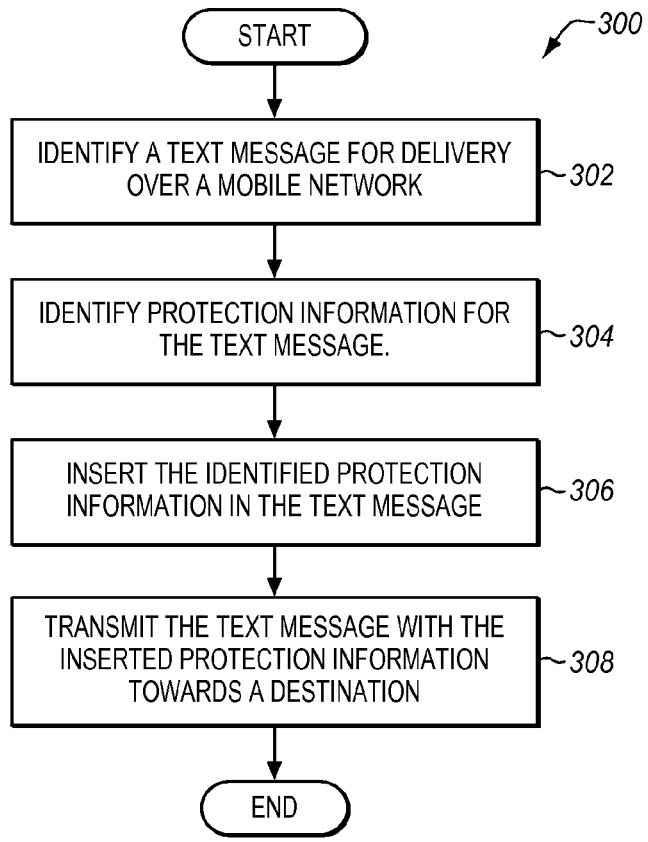
FIG. 3 is a flow chart illustrating a method of inserting protection information in a text message in an exemplary embodiment.

FIG. 3 is a flow chart illustrating a method 300 of inserting protection information in a text message in an exemplary embodiment. The steps of method 300 will be described with reference to device 110 in FIGS. 1-2, but those skilled in the art will appreciate that method 300 may be performed in other devices or systems. The steps of the flow charts described herein are not all inclusive and may include other steps not shown. The steps may also be performed in an alternative order.

In step 302, controller 204 (see FIG. 2) identifies a text message for delivery over mobile network 120. Controller 204 may identify the text message when an end user creates a new text message. Controller 204 may identify the text message when an end user selects an existing text message for reply, forward, or a similar function. Still further, controller 204 may identify the text message when an automated application creates a text message.

In step 304, controller 204 identifies protection information for the text message. Protection information comprises any data that controls archiving of the text message in a network. The protection information may include a protection class that applies to the text message. A protection class is a category of text messages that share a similar type of content. For example, a protection class may be financial, medical, health, parental control, business, social, etc. Thus, text messages that include financial content may be grouped into a common protection class. Text messages that include medical content may be grouped into a common protection class. The protection class may be indicated by a string or value, such as A, B, C, etc.

The protection information may alternatively or additionally include a protection level. A protection level is a degree or amount of protection desired for text messages, such as in a protection class. The protection level may be indicated by a range of integers, such as from 1 to 5. If the protection level is "5" for instance, then a high level of protection is desired for archiving the text message (e.g., no archiving is allowed). This protection level may be desired for financial or medical classes of text messages. If the protection level is "1" for instance, then a lower level of protection is desired for archiving the text message (e.g., archiving is always allowed). This protection level may be desired for social classes of text messages.

Controller 204 may identify the protection information by querying an end user through user interface 206 (assuming that device 110 is an end user device). When the end user composes a new text message or attempts to copy or forward an existing text message, controller 204 may ask the end user for the privacy information via user interface 206. The query may be for a protection class for the text message (e.g., financial, medical, etc), and/or for a protection level (e.g., 1, 2, 3, or high, medium, low). User interface 206 then receives input from the end user indicating the desired protection information, and the user interface 206 provides the end user input to controller 204.

Controller 204 may alternatively identify the protection information by locating predefined or pre-provisioned information stored in device 110. This may be the case if device 110 is an automatic message server, such as an ESME. Those skilled in the art will appreciate that user interface 206 of device 110 may not be needed if device 110 comprises an ESME instead of an end user device.

Figure 4:
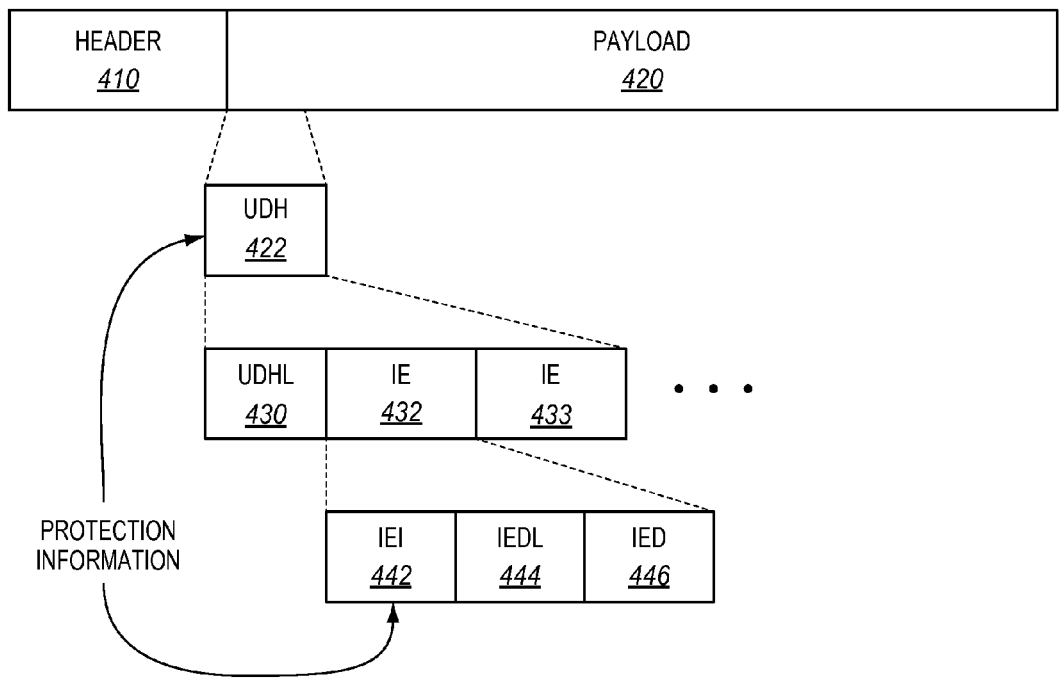
FIG. 4 illustrates a text message in an exemplary embodiment.

In step 306, controller 204 inserts the identified protection information in the text message. Controller 204 may insert the protection information in a header of the text message (or a signaling message encapsulating the text message), or in the payload or body of the text message. Text messages are encoded as a header and a payload in a Protocol Description Unit (PDU). FIG. 4 illustrates a text message 400 in an exemplary embodiment. Text message 400 includes header 410 and payload 420. Header 410 includes metadata for transporting the text message, such as an originating address for the text message, a destination address for the text message, etc. Payload 420 includes the actual content for the text message.

Controller 204 may insert the protection information in the user data of payload 420. For example, controller 204 may insert the protection information in a User Data Header (UDH) 422 of payload 420 (Short Message Transport Layer (SM-TL) of the 3GPP specifications) as shown in FIG. 4. More particularly, UDH 422 includes a User Data Header Length (UDHL) parameter 430 and one or more Information Elements (IE) 432-433. Each Information Element (IE) 432 includes the following sub-parameters (typically in octets): Information Element Identifier (IEI) 442, Information Element Data Length (IEDL) 444, and Information Element Data (IED) 446. Controller 204 may insert the protection information in an IE or IEI.

In another example, controller 204 may insert the protection information in a User Data parameter of payload 420 (based on 3GPP2 specifications). The User Data parameter is part of the Teleservice Layer in the 3GPP2 protocol stack. The protection information may be inserted in the "reserved parameter" of the User Data.

In step 308, network interface 202 transmits the text message with the inserted protection information towards a destination over mobile network 120. In FIG. 1, network interface 202 may transmit the text message (in the appropriate signaling message) to message center 122 in mobile network 120. In response to the text message, message center 122 may perform store-and-forward processing to attempt delivery of the text message to a destination (not shown).

Figure 5:
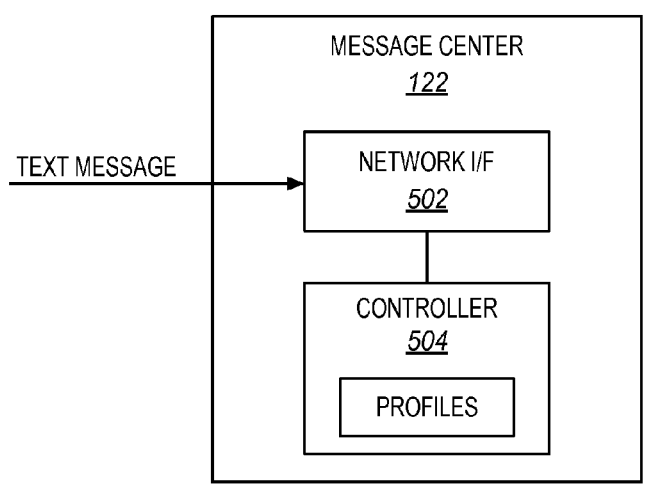
FIG. 5 illustrates a message center in an exemplary embodiment.

The description above applies to a text message sent from device 110 to mobile network 120. However, method 300 may also be performed in message center 122 or in another element of mobile network 120. FIG. 5 illustrates message center 122 in an exemplary embodiment. Message center 122 includes a network interface 502 and a controller 504. If message center 122 receives a text message, such as a text message destined for device 110 (see FIG. 1), then message center 122 may perform method 300 as follows. Controller 504 (see FIG. 5) identifies the text message for delivery over mobile network 120 in step 302 (which is the received text message).

Controller 504 then identifies protection information for the text message (step 304). When method 300 is performed in a network element such as message center 122, the protection information may be predefined or pre-provisioned in a subscriber profile. Thus, when the text message is identified for a particular end user, controller 504 identifies the proper profile and identifies the protection information predefined in the profile. Controller 504 may then insert the identified protection information in the text message (step 306). The protection information inserted in the text message may be new, or may modify (or delete) protection information already inserted in the text message. Network interface 502 then transmits the text message with the inserted protection information towards a destination (step 308) as part of store-and-forward processing.

One assumption when handling a text message in message center 122 is that either the sender or recipient of the text message has subscribed to an archive service (or backup service) for storing copies of the text messages for later use. Thus, message center 122 may communicate with archive server 124 to store a copy of the text message. Before the text message can be archived, message center 122 may operate as described in FIG. 6 to control whether the text message is archived.

Figure 6:
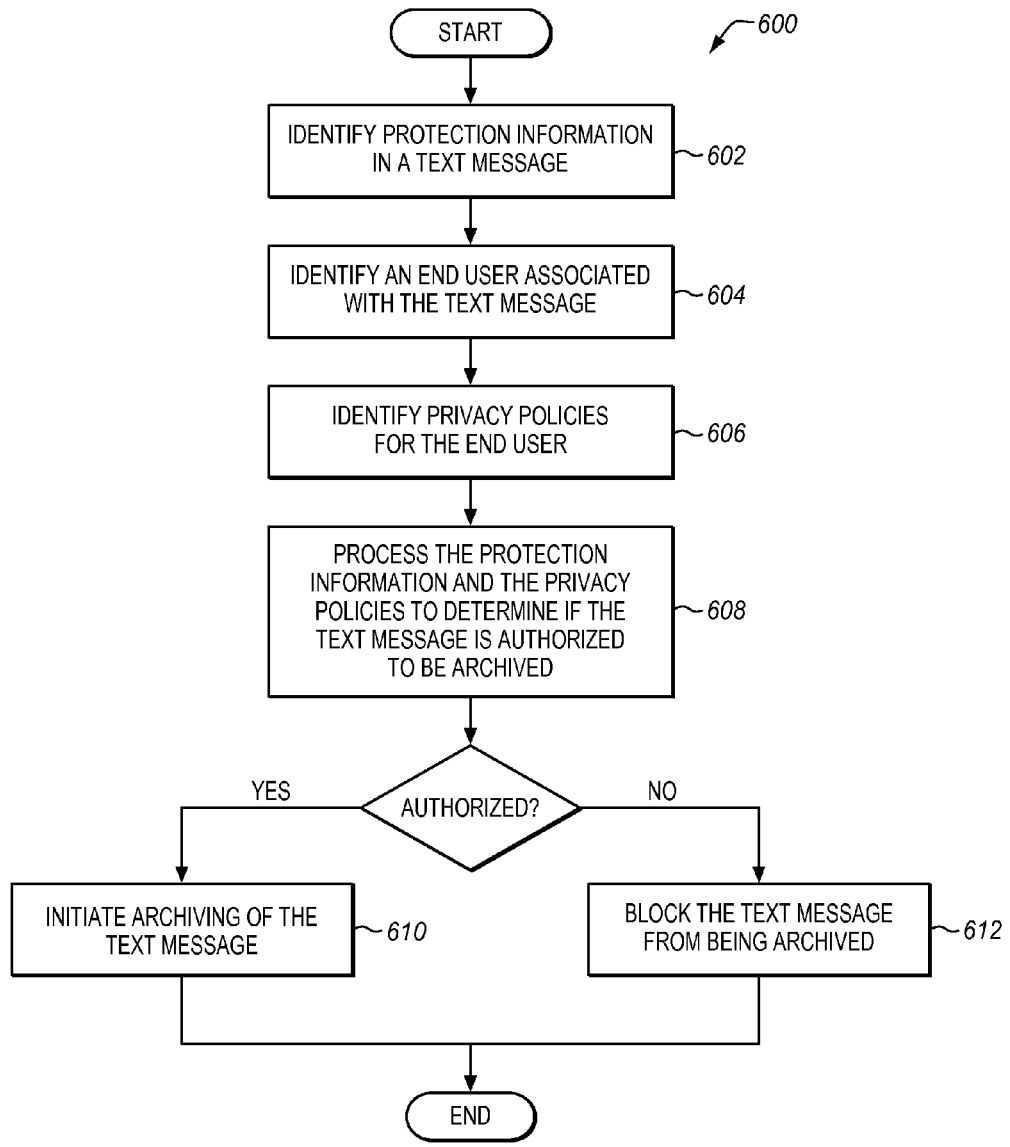
FIG. 6 is a flow chart illustrating a method of controlling how text messages are archived in an exemplary embodiment.

FIG. 6 is a flow chart illustrating a method 600 of controlling how text messages are archived in an exemplary embodiment. The steps of method 600 will be described with reference to message center 122 in FIG. 1 and FIG. 5, but those skilled in the art will appreciate that method 600 may be performed in other devices or systems.

After the text message is received, controller 504 identifies the protection information inserted in the text message in step 602. To do so, controller 504 may parse the header or the user data (i.e., payload) of the text message to identify the protection information. Controller 504 then identifies an end user associated with the text message in step 604. For example, controller 504 may parse the header of the text message to identify a directory number, a network address, a public identifier (PUID), or some other information that identifies an end user that sent or will receive the text message.

In step 606, controller 504 identifies privacy policies defined or provisioned for the end user. The privacy policies may be stored in a subscriber profile for the end user that is stored locally on message center 122 or stored on a remote system. The privacy policies comprise any rules that control archiving (and/or forwarding/copying) of text messages involving the end user. The privacy policies may be defined by the end user or the service provider operating mobile network 120. The privacy policies may take the following conditions into account:

Protection class
Protection level
Copying/Forward/Archiving destinations
Source address
Destination address
Time of Day, Day of Week, etc.
Message types
Network domain
Protocols
Languages
Routing methods
Charging methods
Usage control rules In step 608, controller 504 processes the protection information and the privacy policies (and possibly other information, such as the destination address) to determine if the text message is authorized to be archived. For example, if the protection information indicates a protection class of "financial" and a protection level of "1", then the privacy policies may indicate that the text message is authorized to be archived. If the protection information indicates a protection class of "financial" and a protection level of "3", then the privacy policies may indicate that the text message is not authorized to be archived. The privacy policies may take other information into account such as the source of the text message, the destination of the text message, the time of day, etc.

If the text message is authorized, then controller 504 initiates archiving of the text message in archive server 124 (in step 610). For example, controller 504 may send the text message to archive server 124 for storage. If the text message is not authorized, then controller 504 blocks the text message from being archived in archive server 124 (in step 612). For example, controller 504 may refrain from sending the text message to archive server 124 for storage.

Although method 600 has been described in terms of archiving text messages, a similar method may be used for forwarding text messages, copying text messages, etc.

If message center 122 sends the text message to archive server 124 without performing archiving control as described in method 600, then archive server 124 may operate similar to method 600. Archive server 124 may have a similar structure as shown in FIG. 5 with a network interface and a controller. When archive server 124 receives the text message from message center 122 for archiving, archive server 124 operates as in method 600 before storing the text message. In particular, the controller in archive server 124 identifies the protection information inserted in the text message (step 602), and identifies an end user associated with the text message (step 604). The controller then identifies the privacy policies defined for the end user (step 606). The controller processes the protection information and the privacy policies to determine if the text message is authorized to be archived (step 608). If the text message is authorized, then the controller initiates archiving of the text message (in step 610). For example, the controller may store the text message in a local memory. If the text message is not authorized, then the controller blocks the text message from being archived (in step 612). For example, the controller may refrain from storing the text message in the local memory.

By controlling how individual text messages are archived in the above embodiments, end users advantageously have more privacy with sensitive text messages. Instead of archiving all text messages, end users can specify which text messages are archived through the protection information and the privacy policies. And, there is a determination made on a message-by-message basis as to whether the message is allowed to be achieved. Thus, private text messages, such as those being financial and medical in nature, will not be archived and at risk of being viewed by unauthorized individuals.

Example

Figure 7:
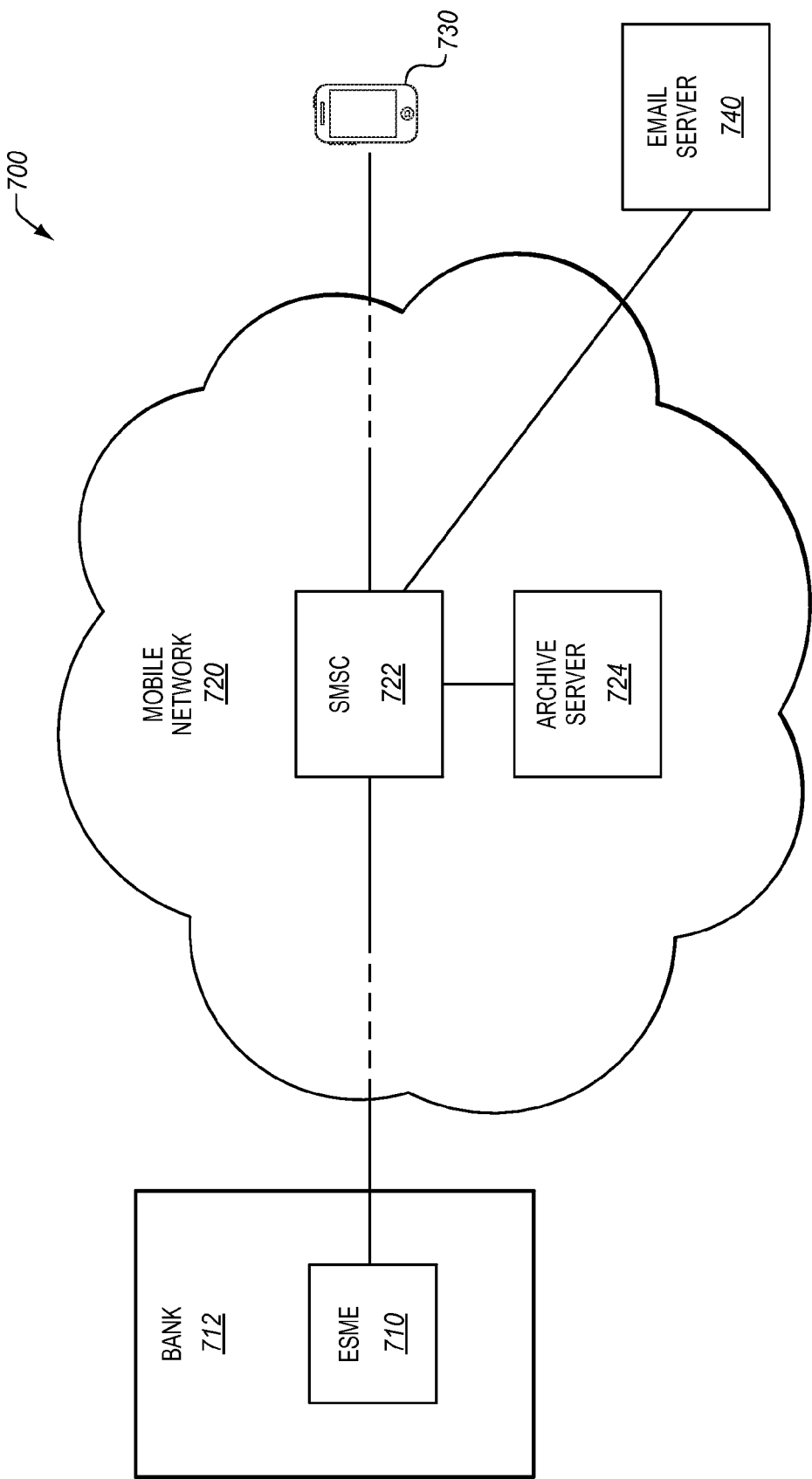
FIG. 7 illustrates a communication system in another exemplary embodiment.

FIG. 7 illustrates a communication system 700 in another exemplary embodiment. Communication system 700 includes a mobile network 720 that provides service to a mobile device 730. Mobile network 720 is also connected to an ESME 710 of a bank 712. ESME 710 is configured to send credit card transaction confirmations to mobile device 730 via SMS messages. Thus, when an end user of mobile device 730 uses his/her credit card, ESME 710 composes an SMS message with the credit card transaction confirmation.

ESME 710 is also configured to provide archiving protection as discussed above. Therefore, ESME 710 identifies the SMS message that was composed for mobile device 730, and identifies protection information for the SMS message. The SMS message in this example is financial in nature. Therefore, ESME 710 identifies the protection information as having a protection class "B" (financial) and a protection level "5" (high) for the SMS message. ESME 710 then inserts the protection information in the user data of the SMS message, and transmits the SMS message to SMSC 722. In response to the SMS message, SMSC 722 may perform store-and-forward processing to attempt delivery of the SMS message to mobile device 730.

In this example, the end user has subscribed to a service that archives SMS messages. Before archiving the SMS message in this instance, SMSC 722 identifies the end user associated with the SMS message, and identifies a subscriber profile for the end user. The subscriber profile includes privacy policies defined for archiving SMS messages. SMSC 722 processes the protection information inserted in the SMS message, and the privacy policies to determine whether this SMS message is allowed to be archived. In this example, the privacy policies disallow archiving of the SMS message to archive server 724 based on a protection class "B" and a protection level "5". Therefore, SMSC 722 blocks the SMS message from being sent to archive server 724 for long-term storage.

The end user also subscribes to a service that forwards a copy of SMS messages to an email account for the end user. Before forwarding the SMS message in this instance, SMSC 722 processes the protection information inserted in the SMS message, and the privacy policies to determine whether this SMS message is allowed to be forwarded. In this example, the privacy policies allow forwarding of the SMS message to an email server 740 (which is hosting the email account of the end user) based on a protection class "B" and a protection level "5". Therefore, SMSC 722 forwards the SMS message to email server 740.

As is evident in this example, the end user of mobile device 730 is able to control whether a sensitive SMS message (i.e., an SMS message containing information on a credit card transaction) is archived or forwarded. A similar process is performed for each individual SMS message that involves this end user. Thus, only authorized SMS messages are archived/forwarded instead of every SMS message.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A system comprising:
   a controller including hardware that is operable to identify a text message for delivery over a mobile network, wherein the text message involves an end user that subscribes to an archive service that archives text messages sent or received by the end user in long-term storage with an archive server;
   the controller is operable to identify protection information for controlling whether the text message is allowed to be archived in the archive server as part of the archive service, and to insert the protection information in the text message; and
   a network interface operable to transmit the text message with the protection information towards a destination.

2. The system of claim 1 wherein:
   the controller is further operable to insert the protection information in user data of the text message.

3. The system of claim 2 wherein:
   the controller is further operable to insert the protection information in an Information Element (IE) of a User Data Header (UDH) in the user data.

4. The system of claim 1 further comprising:
   a user interface operable to query an end user for the protection information applicable to the text message, and to receive input from the end user indicating the protection information.

5. The system of claim 1 wherein:
   the protection information includes:
      a protection class which is a category of text messages that share a similar type of content; and
      a protection level indicating a degree of protection desired for text messages in the protection class.

6. A method comprising:
   identifying a text message for delivery over a mobile network, wherein the text message involves an end user that subscribes to an archive service that archives text messages sent or received by the end user in long-term storage with an archive server;
   identifying protection information for controlling whether the text message is allowed to be archived in the archive server as part of the archive service;
   inserting the protection information in the text message; and
   transmitting the text message with the protection information towards a destination.

7. The method of claim 6 wherein inserting the protection information in the text message comprises:
   inserting the protection information in user data of the text message.

8. The method of claim 7 wherein inserting the protection information in user data of the text message comprises:
   inserting the protection information in an Information Element (IE) of a User Data Header (UDH) in the user data.

9. The method of claim 6 further comprising:
   querying an end user for the protection information applicable to the text message.

10. The method of claim 6 wherein:
    the protection information includes:
       a protection class which is a category of text messages that share a similar type of content; and
       a protection level indicating a degree of protection desired for text messages in the protection class.

* * * * *